US012750846B2

(12) United States Patent
Li

(10) Patent No.: US 12,750,846 B2
(45) Date of Patent: Sep. 29, 2026

(54) INFORMATION PROCESSING METHOD AND APPARATUS, COMMUNICATION DEVICE, AND STORAGE MEDIUM

(71) Applicant: Beijing Xiaomi Mobile Software Co., Ltd., Beijing (CN)

(72) Inventor: Yanhua Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 291 days.

(21) Appl. No.: 18/580,465

(22) PCT Filed: Jul. 23, 2021

(86) PCT No.: PCT/CN2021/108226

§ 371 (c)(1),
(2) Date: Jan. 18, 2024

(87) PCT Pub. No.: WO2023/000323

PCT Pub. Date: Jan. 26, 2023

(65) Prior Publication Data

US 2024/0323954 A1 Sep. 26, 2024

(51) Int. Cl.

*H04W 72/1268* (2023.01)
*H04W 28/02* (2009.01)
*H04W 72/0453* (2023.01)
*H04W 72/543* (2023.01)

(52) U.S. Cl.

CPC ... *H04W 72/1268* (2013.01); *H04W 28/0268* (2013.01); *H04W 72/0453* (2013.01); *H04W 72/543* (2023.01)

(58) Field of Classification Search

CPC ......... H04W 28/0268; H04W 72/0453; H04W 72/12; H04W 72/1268; H04W 72/23

See application file for complete search history.

(56) References Cited

U.S. PATENT DOCUMENTS

| | | | |
|---|---|---|---|
| 2019/0069321 A1 | 2/2019 | Akkarakaran et al. | |
| 2019/0335451 A1 | 10/2019 | Yang et al. | |
| 2021/0160904 A1* | 5/2021 | Shi | H04L 5/0064 |
| 2021/0168649 A1 | 6/2021 | Turtinen et al. | |

FOREIGN PATENT DOCUMENTS

| | | |
|---|---|---|
| CN | 108811099 A | 11/2018 |
| CN | 108966356 A | 12/2018 |
| CN | 111586643 A | 8/2020 |
| CN | 112887106 A | 6/2021 |
| CN | 112889322 A | 6/2021 |

(Continued)

OTHER PUBLICATIONS

State Intellectual Property Office of the People's Republic of China, Office Action and Search Report Issued in Application No. 2021800022189, Sep. 26, 2025, 15 pages.

(Continued)

*Primary Examiner* — Zhensheng Zhang

(74) *Attorney, Agent, or Firm* — Finnegan, Henderson, Farabow, Garrett & Dunner, L.L.P.

(57) ABSTRACT

An information processing method is performed by a network device, and includes: sending grant information, wherein the grant information is used for logical channel multiplexing for a first type of service.

18 Claims, 6 Drawing Sheets

(56) References Cited

FOREIGN PATENT DOCUMENTS

| | | | |
|---|---|---|---|
| WO | 2018126477 | A1 | 7/2018 |
| WO | WO 2019/242379 | A1 | 12/2019 |
| WO | 2020080913 | A | 4/2020 |
| WO | 2020191660 | A1 | 10/2020 |
| WO | WO 2021/081824 | A1 | 5/2021 |

OTHER PUBLICATIONS

The First Office Action issued by the State Intellectual Property Office of People's Republic of China on May 24, 2025, in corresponding Application No. CN 202180002218.9, 7 pages.

"Multiplexing of UL transmissions of different reliability requirements", CATT, 3GPP TSG RAN WG1 Meeting #92bis, R1-1803768, Sanya, China, Apr. 16-20, 2018, 7 pages.

"RAN2 aspects of group scheduling", Huawei, CBN, HiSilicon, 3GPP TSG-RAN WG2 Meeting #114-e, R2-2106283, E-meeting, May 19-27, 2021, 10 pages.

Extended European Search Report Issued in Application No. 21950572.4 dated Apr. 30, 16, 2025, 11 pages.

ISA State Intellectual Property Office of the People's Republic of China, Written Opinion of the International Searching Authority Issued in Application No. PCT/CN2021/108226, Apr. 20, 2022, WIPO, 7 pages.

ISA State Intellectual Property Office of the People's Republic of China, International Search Report issued in Application No. PCT/CN2021/108226, Apr. 20, 2022, WIPO, 5 pages.

Intel Corporation, "MBS MAC Layer and Group Scheduling Aspects", 3GPP TSG-RAN WG2 Meeting #113bis-e R2-2102839 Electronic meeting, Apr. 12-20, 2021, 8 pages.

Intel Corporation, "MBS MAC Layer and Group Scheduling Aspects", 3GPP TSG-RAN WG2 Meeting #114-e R2-2104876 Electronic meeting, May 19-27, 2021, 10 pages.

Intellectual property India, Office Action Issued in Application No. 202417012330, May 15, 2026, 8 pages.

* cited by examiner

INFORMATION PROCESSING METHOD AND APPARATUS, COMMUNICATION DEVICE, AND STORAGE MEDIUM

CROSS-REFERENCE TO RELATED APPLICATION

The present application is a U.S. National Stage of International Application No. PCT/CN2021/108226, filed on Jul. 23, 2021, the contents of which are incorporated herein by reference in their entirety.

TECHNICAL FIELD

The present disclosure relates to, but is not limited to, the field of wireless communication technologies, and in particular to information processing methods and apparatuses, communication devices and storage media.

BACKGROUND

Logical channels include control channels and traffic channels. A control channel can be used for transmitting signaling, synchronizing data, etc. A traffic channel can usually be used to transmit service data. For a logical channel, an access network device (e.g., a base station) on a network side can configure and/or schedule the logical channel. A user equipment (UE) will perform logical channel multiplexing according to configuration information of the logical channel and/or scheduling grant (e.g., grant information) of the logical channel.

SUMMARY

Embodiments of the present disclosure provide information processing methods and apparatuses, communication devices, and storage media.

A first aspect of an embodiment of the present disclosure provides an information processing method, which is performed by a network device, and the method includes:

sending grant information, where the grant information is used for logical channel multiplexing for a first type of service.

A second aspect of an embodiment of the present disclosure provides an information processing method, which is performed by a user equipment (UE), and the method includes:

receiving grant information, where the grant information is used for logical channel multiplexing for a first type of service.

A third aspect of an embodiment of the present disclosure provides a communication device, including a processor, a transceiver, a memory and an executable program stored on the memory and capable of being run by the processor, where the processor executes: sending grant information, where the grant information is used for logical channel multiplexing for a first type of service.

It should be understood that the above general description and the following detailed descriptions are exemplary and explanatory only and do not limit the embodiments of the present disclosure.

BRIEF DESCRIPTION OF DRAWINGS

The accompanying drawings, which are incorporated in and constitute a part of the specification, illustrate embodiments consistent with the present disclosure, and are used together with the specification to explain the principles of the present disclosure.

DETAILED DESCRIPTION

Reference will now be made in detail to embodiments, examples of which are illustrated in the accompanying drawings. When the following description refers to the accompanying drawings, unless otherwise indicated, the same numbers in different accompanying drawings indicate the same or similar elements. Implementations described in the following embodiments do not represent all implementations consistent with embodiments of the present disclosure. Rather, they are merely examples of apparatuses and methods consistent with some aspects of embodiments of the present disclosure as detailed in the appended claims.

Terms used in embodiments of the present disclosure are only for a purpose of describing specific embodiments, and are not limiting the embodiments of the present disclosure. Singular forms of "a", "said", and "the" used in the embodiments of the present disclosure and in the claims are also intended to include majority forms, unless the context clearly indicates otherwise. It should also be understood that the term "and/or" as used herein refers to any or all of the possible combinations containing one or more of the listed items in association.

It should be understood that although terms first, second, third, etc. may be used to describe various information in the embodiments of the present disclosure, this information should not be limited to these terms. These terms are used only to distinguish the same type of information from one another. For example, without departing from the scope of the present disclosure, first information can also be called second information, and similarly, the second information can also be called the first information. Depending on the context, the word "if" as used herein can be interpreted as "at" or "when" or "in response to determining".

Figure 1:
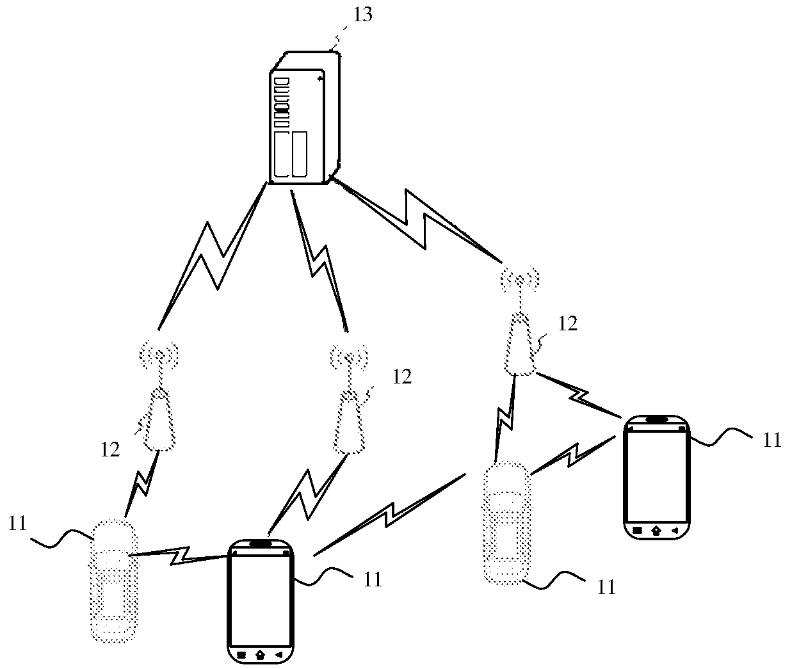
FIG. 1 is a schematic structural diagram of a wireless communication system according to an embodiment of the present disclosure.

Please refer to FIG. 1, which shows a schematic structural diagram of a wireless communication system according to an embodiment of the present disclosure. As shown in FIG. 1, the wireless communication system is a communication system based on cellular mobile communication technology, which may include a plurality of UEs 11 and a plurality of access devices 12.

A UE 11 may be a device that provides voice and/or data connectivity to users. The UE 11 can communicate with one or more core networks through a radio access network (RAN). The UE 11 can be an Internet of Things UE, such as a sensor device, a mobile phone (or a "cellular" phone) and a computer with an Internet of Things UE. For example, the UE 11 can be a fixed, portable, pocket-sized, handheld, computer-built or vehicle-mounted device. For example, a station (STA), a subscriber unit, a subscriber station, a mobile station, a mobile, a remote station, an access point, a remote terminal, an access terminal, a user terminal, a user agent, a user device, or a user equipment (UE). Or, the UE 11 can also be a device for an unmanned aerial vehicle. Or, the UE 11 can also be a vehicle-mounted device, for example, a driving computer with wireless communication function or an external onboard computer wireless communication device. Or, the UE 11 can also be a roadside device, such as a street lamp, a signal lamp or other roadside device with wireless communication function.

The access device 12 may be a network-side device in a wireless communication system. The wireless communication system can be the 4th generation mobile communication (4G) system, also known as the long term evolution (LTE) system. Or, the wireless communication system can also be a 5G system, also known as a new radio (NR) system or a 5G NR system. Or, the wireless communication system can also be a further next-generation system of a 5G system. The access network in the 5G system can be called a new generation-radio access network (NG-RAN). Or, the wireless communication system can be an MTC system.

The access device 12 may be an evolved access device (eNB) adopted in the 4G system. Or, the access device 12 can also be an access device (gNB) adopting a centralized and distributed architecture in the 5G system. When the access device 12 adopts a centralized and distributed architecture, it usually includes a central unit (CU) and at least two distributed units (DUs). The centralized unit is provided with a protocol stack of a packet data convergence protocol (PDCP) layer, a radio link Control Protocol (RLC) layer and a media access control (MAC) layer, a distributed unit is provided with a protocol stack of a physical (PHY) layer, and the embodiments of the present disclosure do not limit specific implementations of the access device 12.

A wireless connection can be established between the access device 12 and the UE 11 through an air interface. In different implementations, the air interface is an air interface based on the fourth generation mobile communication network technology (4G) standard; or the air interface is an air interface based on the fifth generation mobile communication network technology (5G) standard, for example, the air interface adopts New Radio standards; or, the air interface can also be an air interface based on a more next generation mobile communication network technology standard based on 5G.

In some embodiments, an end to end (E2E) connection can further be established between UEs 11. For example, scenarios of vehicle to vehicle (V2V) communication, vehicle to Infrastructure (V2I) communication and vehicle to pedestrian (V2P) communication in vehicle to everything (V2X) communication.

In some embodiments, the wireless communication system may further include a network management device 13.

A plurality of access devices 12 are respectively connected with the network management device 13. The network management device 13 may be a core network device in a wireless communication system. For example, the network management device 13 may be a mobility management entity (MME) in an evolved packet core (EPC). Or, the network management device can also be other core network devices, such as a serving gateway (SGW), a public data network gateway (PGW), a policy and charging rules function (PCRF), a home subscriber server (HSS), etc. Embodiments of the present disclosure do not limit the implementation form of the network management device 13.

In the technical solution provided by the embodiments of the present disclosure, when a network device such as a base station perform grant scheduling for logical channel multiplexing, it sends grant information for a first type of service, thus realizing scheduling for the first type of service at a MAC layer where the logical channel is located, meeting special scheduling requirements of this specific type of first type of service, and thus realizing scheduling optimization of the logical channel.

Figure 2:
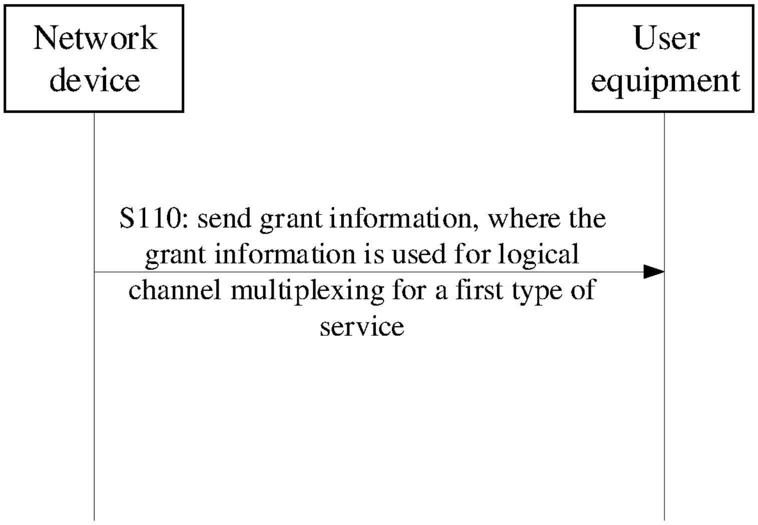
FIG. 2 is a flowchart of an information processing method according to an embodiment of the present disclosure.

As shown in FIG. 2, an embodiment of the present disclosure provides an information processing method, performed by a network device, and the method includes:

At S110, grant information is sent, where the grant information is used for logical channel multiplexing for a first type of service.

The network device includes but is not limited to an access network device such as a base station.

For example, the network device sends downlink control information (DCI) indicating the grant information.

In an embodiment of the present disclosure, the grant information may be a scheduling grant for logical channel multiplexing for a first type of service.

The grant information can be broadcast, multicast or unicast. A sending mode of the grant information is not limited, and can be specifically determined according to the number of UEs involved in the grant information and/or a current scheduling situation of a network device. For example, when multiple UEs are involved, it can be sent by multicast or broadcast. For logical channel scheduling for a single UE or when UE granularity logical channel scheduling needs to be implemented, the grant information may be sent by unicast.

In an embodiment of the present disclosure, a distribution of the grant information is equivalent to the network device indicating to the UE that the logical channel scheduled by the current grant information is used for carrying the first type of service.

In an embodiment of the present disclosure, the scheduling grant of the logical channel can be based on the service type, thereby realizing a special grant scheduling of the logical channel of a certain service.

The first type of service includes at least one of:

a vertical field service; or a multi-modality service.

The vertical field service here refers to a service scheduling that focuses on a certain field, for example, the service that focuses on an information technology (IT) field, the service that focuses on a cloud computing domain and/or a service that focuses on a live video broadcast field.

The multi-modality service may include multi-modality input service and/or multi-modality output service.

The multi-modality (or modality) service involves sources or forms of various information, for example, human beings have senses of touch, hearing, sight, and smell; and media of information include voice, video, text, etc. In order to perceive the user's input from multiple dimensions, there are many types and numbers of APPs and/or apparatuses used to collect multi-modality information (information related to multi-modality services), including multiple cameras, speakers, sensors, keyboards, fingerprint collectors and so on. These apparatuses for collecting multiple modality information can be used in a same device or across devices.

On a server side, data fusion of multi-modality data sets is needed (which is also called information fusion), e.g., incomplete information about an environmental feature provided by multiple sensors or information sources is synthesized and processed by data analysis to form a relatively complete and consistent perceptual description, so as to realize more accurate identification and judgment functions. After the server completes data fusion and makes a decision, it gets multi-modality output, which is a process of service distribution. Often the service is not distributed to a single device, but is likely to be a linkage of several related devices. For example, by judging the owner's return through voiceprint and video, a curtain can be closed as well as an air conditioner can be turned on simultaneously.

In some embodiments, the first type of service may further include:

federal learning service.

In a reference framework of federated learning, it is also necessary to send local calculation results from multiple candidate UEs to the server at the same time or within a specified delay, and if missing a result of local computation of a user, it will lead to a failure of a whole reasoning process.

Therefore, in a scenario where multiple devices cooperate in groups, one of the most important scenarios is that data collected by the terminal devices can be sent to the server within a certain delay or at the same time. If a user's data packet is delayed, it will not only affect the corresponding service flow, but also affect other terminals that perform the task together, causing the data transmitted by other terminals to be useless in the server and discarded. Therefore, when scheduling resources, it is necessary to allocate this type of resources for multi-modality data flows to give priority to the service, so it is necessary to optimize an existing logical channel multiplexing mechanism.

A service involved in the federal learning is the aforementioned federal learning service.

In an embodiment of the present disclosure, the first type of service may be a service that involves a plurality of UEs to complete together. At a logical channel level, special scheduling for this type of service can realize a resource scheduling guarantee of multiplexing at the traffic logical channels level.

In an embodiment, the grant information includes:

attribute information, where the attribute information indicates that the grant information is aimed at the first type of service; and/or auxiliary information, where the auxiliary information indicates one or more logical channels related to the grant information.

In an embodiment, both the attribute information and/or the auxiliary information can be information sent at the same time as the grant information or information sent separately.

If they are sent at the same time, the grant information received by the UE includes attribute information and/or auxiliary information, so as to determine the logical channel and/or the service for grant scheduling to which the grant information relates according to the attribute information and/or auxiliary information.

In some embodiments, the attribute information includes at least one of the following:

a service identification of the first type of service; or a service attribute of the first type of service.

The service identification will indicate an identification (ID) of the service, so that a service targeted by the grant information can be determined according to the service identification.

The service attribute describes an attribute of the first type of service, and all services whose attributes hit the attributes described in the attribute information belong to the first type of service.

In some embodiments, the auxiliary information includes at least one of the following:

a logical channel list, where the logical channel list includes: a logical channel identification ID of at least one logical channel; or group information of a logical channel group, where the logical channel group includes at least one logical channel.

The logical channel list includes one or more logic channel identifications (LCIDs) of one or more logical channels. When the logical channel list contains multiple LCIDs, the logical channels indicated by these LCIDs can belong to one logical channel group or different logical channel groups.

In some embodiments, the auxiliary information may include group information of one or more logical channel groups, which includes, but is not limited to, group identification(s) and/or group name(s). A logical channel group may include one or more logical channels. If the auxiliary information contains group information of a logical channel group, it means that the logical channel group will be used for a certain first type of service.

Figure 3:
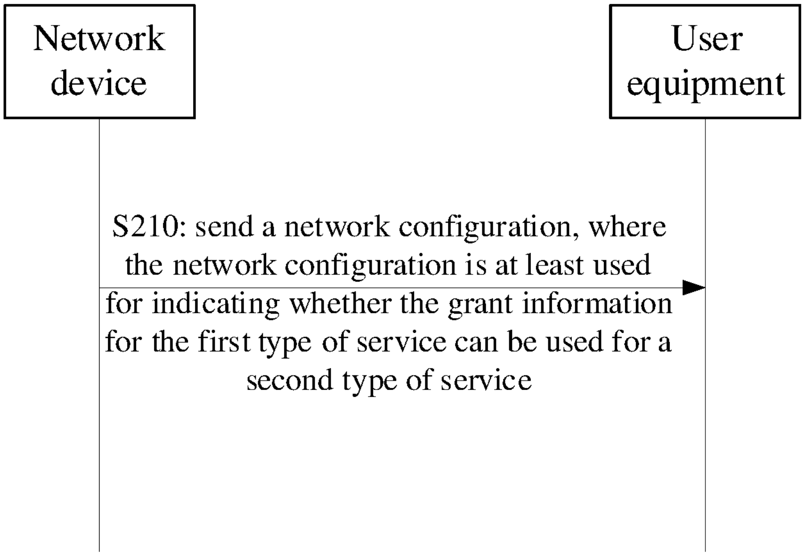
FIG. 3 is a flowchart of an information processing method according to an embodiment of the present disclosure.

As shown in FIG. 3, an embodiment of the present disclosure provides an information processing method, performed by a network device, and the method includes:

At S210, a network configuration is sent, where the network configuration is at least used for indicating whether the grant information for the first type of service can be used for a second type of service.

The second type of service here is a service different from the first type of service mentioned above.

The network configuration can be RRC configuration. For example, the network configuration is included in the configuration information of the logical channel sent via RRC signaling, or the network configuration sent separately via RRC signaling that is different from the configuration information of the logical channel.

For example, the configuration information for a logical channel has one bit, and two bit values of the bit can indicate that the logical channel can be used for the second type of service or not.

The above is just an example. The network configuration can be RRC configuration, but the specific implementation is not limited to RRC configuration.

In an embodiment, the network configuration contains a first indication, and the grant information cannot be used for logical channel multiplexing for the second type of service; and/or the network configuration contains a second indication, and the grant information can be used for logical channel multiplexing for the second type of service.

The second indication and the first indication are different indications. For different logical channels that are all configured for the first type of service, some channels may correspond to the first indication and some channels may correspond to the second indication.

For a single logical channel of the first type of service, the indication included in the network configuration may be the first indication or the second indication.

Through the distribution of network configuration, the network device can control whether the UE uses the logical channel for the first type of service for carrying the second type of service.

In some embodiments, the network configuration may be sent before the grant information is distributed, or it may be dynamically sent according to a load rate of network resources after the grant information is distributed.

For example, the network device monitors that a current service volume of the second type of service is large while a service volume of the first type of service is small, at this time, in response to a situation of traffic volume, a network configuration containing the second indication may be distributed, so that the UE, after receiving this network configuration, will use the logical channel more efficiently according to the network configuration.

Figure 4:
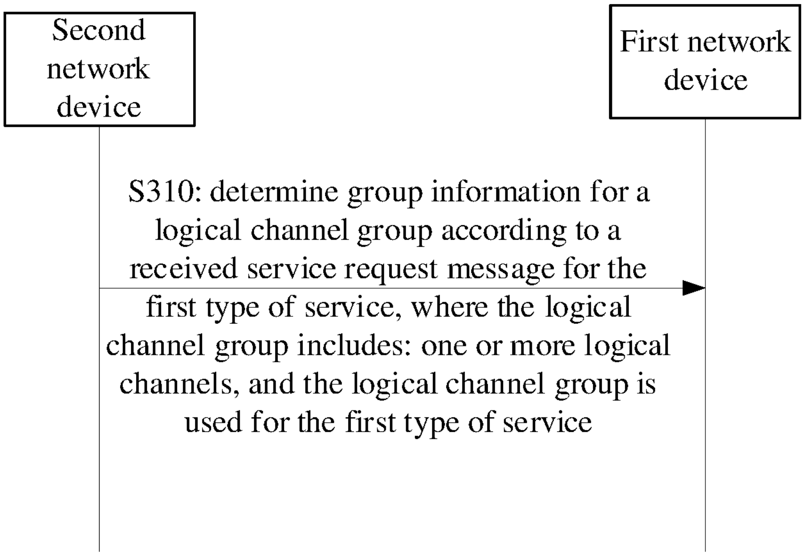
FIG. 4 is a flowchart of an information processing method according to an embodiment of the present disclosure.

As shown in FIG. 4, an embodiment of the present disclosure provides an information processing method, performed by a first network device, which may include:

At S310, group information for a logical channel group is determined according to a received service request message for the first type of service, where the logical channel group includes: one or more logical channels, and the logical channel group is used for the first type of service.

The first network device can be an access network device such as a base station. The service request message here may come from a second network device, and the second network device may be a core network device. That is, the service request message may come from a core network, for example, a service request message sent by a core network device such as a session management function (SMF) and/or a user plane function (UPF) of the core network.

If the service request message is for the first type of service, it may indicate one or more packet data unit (PDU) sessions involved in the first type of service, or indicate one or more quality of service (QoS) flows involved in the first type of service. According to a mapping relationship between a PDU session and a logical channel and/or a mapping relationship between a QoS flow and a logical channel in related policies, logical channels that may be needed for the first type of service can be determined, and these logical channels can be grouped into a logical channel group, thus obtaining group information of the logical channel group. This group of information can be included in the auxiliary information carrying the grant information, or it can be distributed separately.

This information processing method can be performed alone or in combination with any of the previous embodiments, for example, in combination with the methods shown in FIG. 2 and/or FIG. 3. For example, if the information processing method provided by this embodiment is combined with the method provided by the previous embodiments, the group information of the logical channel group determined by the method can be carried in the auxiliary information contained in the grant information. Or, the LCIDs of multiple logical channels in a logical channel group for the first type of service can be carried in a logical channel list and sent to the UE.

In some embodiments, the service request message is used for indicating one or more PDU sessions associated with the first type of service; or, the service request message is used for indicating one or more QoS flows associated with the first type of service.

This is only an example of a service request message, and the specific implementation is not limited to this example.

In some embodiments, the S110 may include, but is not limited to, sending the grant information according to the group information.

In an embodiment, the grant information is used for a scheduling of uplink transmission.

That is, the grant information is a scheduling of the logical channel used by the UE to send information to the base station, that is, a UL grant.

That is, the UE will subsequently carry service data of the first type of service on the logical channel for the first type of service according to the uplink transmission.

In an embodiment, the grant information is used for the scheduling of the uplink transmission, and a logical channel corresponding to the group information is used for a downlink transmission of a specific task.

Figure 5:
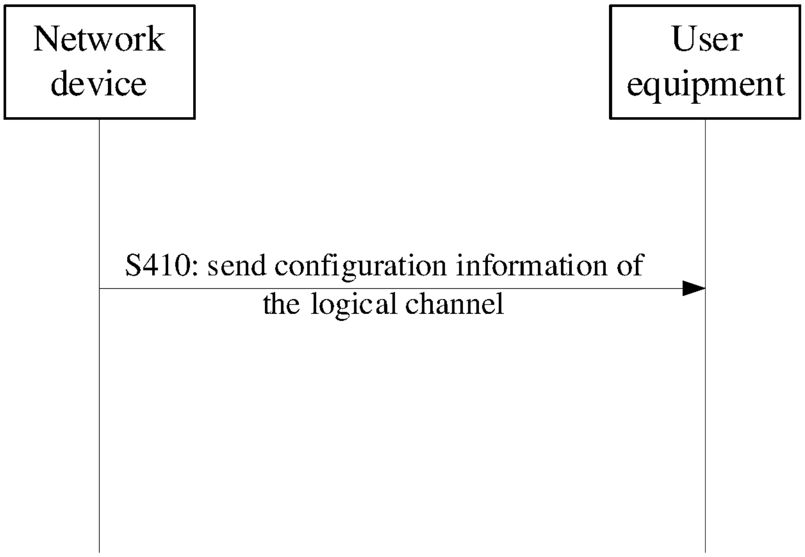
FIG. 5 is a flowchart of an information processing method according to an embodiment of the present disclosure.

As shown in FIG. 5, an embodiment of the present disclosure provides an information processing method, performed by a network device, and the method includes:

at S410, configuration information of the logical channel is sent.

The configuration information indicates at least one of:

group information of a logical channel group; where the logical channel group includes at least one logical channel; or a binding relationship between logical channel and service type.

The network device here can be an access network device such as a base station. The configuration information of the logical channel here is sent to the UE.

The configuration information may be a configuration of a logical channel.

The configuration information may be sent via RRC configuration, RRC connection configuration, RRC reconfiguration and/or RRC connection reconfiguration messages.

The configuration information may be information obtained for configuration of all logical channels.

The configuration information can be distributed according to the logical channel group composed of logical channels and/or a type of service bound to one or more logical channels. That is, the configuration information itself can be oriented at least towards group information for all logical channels and/or binding relationship(s) to service type(s).

The configuration information may be distributed in a configuration stage of the logical channel, while the grant information may be distributed in a scheduling stage of the logical channel.

Type of services involved in the binding relationship here may at least include the aforementioned first type of service. In other embodiments, the type of service involved in the binding relationship can be any type, for example, the type of service includes but is not limited to the aforementioned second type of service. If the binding relationship involves the second type of service, a logical channel bound to the first type of service will be different from a logical channel bound to the second type of service.

Figure 6:
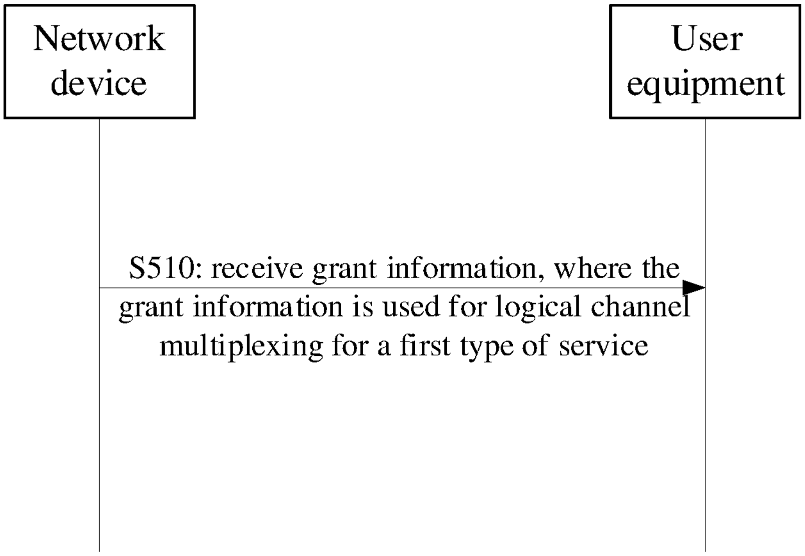
FIG. 6 is a flowchart of an information processing method according to an embodiment of the present disclosure.

As shown in FIG. 6, an embodiment of the present disclosure provides an information processing method, performed by a UE, and the method includes:

At S510, grant information is received, where the grant information is used for logical channel multiplexing for a first type of service.

The UE may be a fixed UE or a mobile UE of various types. For example, the UE may be a multi-modality device, which includes but is not limited to: a multi-modality input device and/or a multi-modality output device. As another example, the UE may be a UE performing federated learning. The UE may include a mobile phone, a tablet computer, a wearable device or a vehicle-mounted device. The above is only an example of UE, and the specific implementation is not limited to this example.

In an embodiment of the present disclosure, the grant information received by the UE may be a grant scheduling for logical channel multiplexing for the first type of service.

In some embodiments, the first type of service includes at least one of the following:

a vertical field service; or a multi-modality service.

In other embodiments, the first type of service may further include: federal learning service.

In some embodiment, the grant information includes:

attribute information, where the attribute information indicates that the grant information is aimed at the first type of service; or, auxiliary information, where the auxiliary information indicates one or more logical channels associated with the grant information.

Based on the attribute information and/or auxiliary information contained in the grant information, the UE can schedule the type of service referenced by the logical channel according to current grant information, for example, whether it is applied to the first type of service.

In an embodiment, the network device can only add the auxiliary information and/or attribute information to the grant information of the first type of service, so that the UE can directly consider the grant information of the logical channel containing the attribute information and the auxiliary information as the scheduling of the logical channel for the first type of service. However, the grant information for the second type of service may not include the auxiliary information and/or attribute information, which will further reduce an overall bit overhead of the grant information distributed by the network device and also reduce a bit overhead of the grant information received by the UE.

In another embodiment, the grant information of the network device for all types of services may include auxiliary information and/or attribute information, so whether the grant information currently received by the UE is specifically for the first type of service needs to be determined according to information content of the attribute information and/or the auxiliary information.

In some embodiments, the attribute information includes at least one of the following:

a service identification of the first type of service; or a service attribute of the first type of service.

In some embodiments, the auxiliary information includes:

a logical channel list, where the logical channel list includes: a logical channel identification ID of at least one logical channel; or group information of a logical channel group, where the logical channel group includes at least one logical channel.

Figure 7:
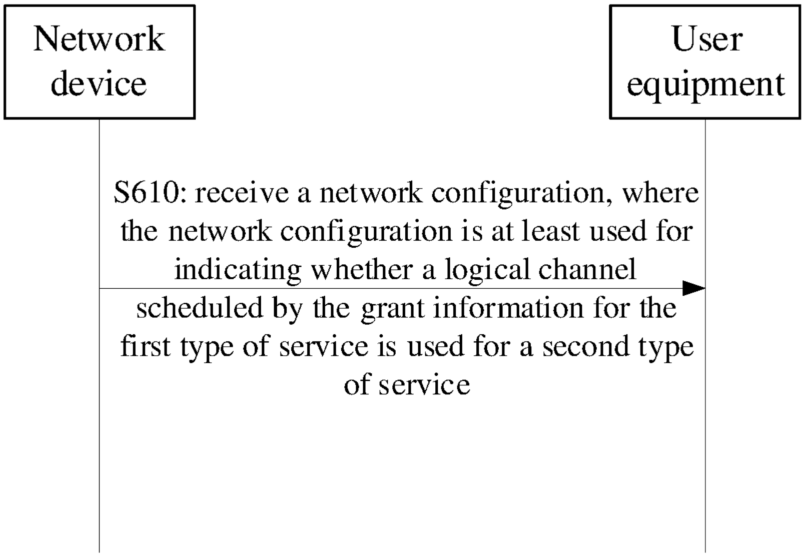
FIG. 7 is a flowchart of an information processing method according to an embodiment of the present disclosure.

As shown in FIG. 7, an embodiment of the present disclosure provides an information processing method, which can be performed by a UE, and the method may include:

At S610, a network configuration is received, where the network configuration is at least used for indicating whether a logical channel scheduled by the grant information for the first type of service is used for a second type of service.

For a network configuration, when UE determines, based on the network configuration, that the logical channel for the first type of service is allowed to be used for the second type of service, the UE carries the second type of service on the logical channel for the first type of service, so that the waste of wireless resources corresponding to the logical channel can be reduced. If the network configuration indicates that the logical channel used for the first type of service is prohibited from being used for the second type of service, the second type of service is mapped to other logical channels other than the logical channel used for the first type of service.

For example, the network configuration contains a first indication that a logical channel associated with the grant information cannot be used for logical channel multiplexing for the second type of service; and/or, the network configuration contains a second indication, and the logical channel associated with the grant information can used for logical channel multiplexing for the second type of service.

For different logical channels, the network configuration may contain the same or different indications.

The network configuration can be a configuration in which the configuration information of logical channels is distributed separately, or it can be a configuration distributed synchronously with the configuration information of logical channels.

If the network configuration is distributed synchronously with the configuration information of the logical channel, one bit can be added to the configuration information, and a bit value of this bit indicates whether the logical channel for the first type of service can be used for the second type of service.

In an embodiment, the grant information is used for a scheduling of uplink transmission.

The network device sends the grant information for uplink transmission to the UE, so that the UE can perform uplink transmission according to the grant information after receiving the grant information.

In an embodiment, the grant information is used for the scheduling of the uplink transmission, and a logical channel corresponding to the group information will be used for a downlink transmission of the first type of service.

In this way, after the UE determines the logical channel(s) for its uplink transmission of the first type of service, the UE will know that in a downlink transmission direction, the logic channel identification(s) contained in the grant information is also LCID(s) of logical channel(s) for the downlink transmission of the first type of service.

Figure 8:
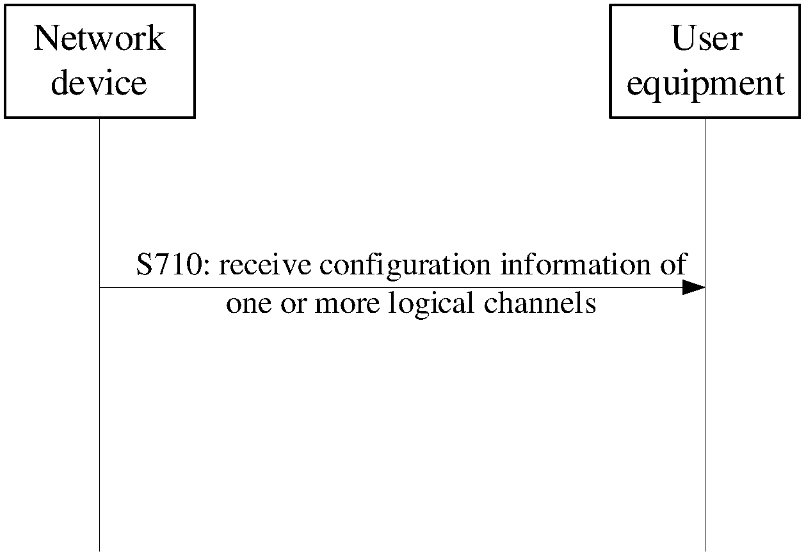
FIG. 8 is a flowchart of an information processing method according to an embodiment of the present disclosure.

As shown in FIG. 8, an embodiment of the present disclosure provides an information processing method, which can be performed by a UE and may include:

At S710, configuration information of one or more logical channels is received, where the configuration information indicates at least one of:

group information of a logical channel group; where the logical channel group includes at least one logical channel; or a binding relationship between logical channel and service type.

The configuration information may be information obtained for configuration of all logical channels.

The configuration information may be a configuration of a logical channel.

The configuration information may be sent via RRC configuration, RRC connection configuration, RRC reconfiguration and/or RRC connection reconfiguration messages.

The configuration information may be information obtained for configuration of all logical channels.

The configuration information can be sent according to the logical channel group composed of logical channels and/or a type of service bound to a logical channel. That is, the configuration information itself can be oriented at least towards group information and/or binding relationships to service types for all logical channels.

The configuration information is sent in a configuration stage of the logical channel, while the grant information can be sent in a scheduling stage of the logical channel.

Type of services involved in the binding relationship here may at least include the aforementioned first type of service. In other embodiments, the type of service involved in the binding relationship can be any type, for example, the type of service includes but is not limited to the aforementioned second type of service. If the binding relationship involves the second type of service, a logical channel bound to the first type of service will be different from a logical channel bound to the second type of service.

In some embodiments, the configuration information of the logical channel may further include information on conditions or restrictions for the use of the logical channel, for example, the configuration information may include at least one of the following:

allowed subcarrier spacing list (allowed SCS-List);

maximum physical uplink shared channel duration (max PUSCH-Duration); or pre-configured allowed serving cell (Scell) information.

Based on the pre-configured allowed SCS-List, the UE will determine whether the allowed SCS-list contains an index of the subcarrier spacing corresponding to the grant.

The UE will determine whether the max PUSCH-Duration is longer than or equal to a PUSCH transmission duration corresponding to the grant.

If the grant is a Type 1 free grant, the UE will determine whether it is supported based on pre-configuration in the configuration information.

The UE will determine whether a pre-configured Scell contains a scell corresponding to the grant according to the pre-configuration.

In some embodiments, the configuration information may be broadcast or unicast before the grant information is sent, and the specific sending mode is not limited.

When scheduling resources, it is necessary to allocate this type of resources for multi-modality data flows to give priority to the service, so it is necessary to optimize an existing logical channel multiplexing mechanism.

A new logical channel multiplexing restriction corresponding to a specific service type is added to the logical channel multiplexing restrictions, and the specific service type is one of the first type of services.

As an embodiment, a specific type of service may be a vertical domain service.

As an embodiment, a specific type of service may be a multi-modality service.

For example, in the grant information provided by a network, it can be indicated that it is used for logical channel multiplexing corresponding to a specific service type.

For another example, the grant information provided by the network may be an indication in an uplink grant, provided by the network, to inform the UE that an attribute of the current grant is used by a logical channel corresponding to a specific service type.

The following takes a multi-modality service of the logical channel as an example to illustrate.

As an embodiment, the attribute of current grant is multi-modality service, the UE can use the logical channel(s) involved in the grant to transmit the multi-modal service, that is, the UE can use the grant, which can be described by the grant information.

For example, if some logical channels are granted to be scheduled for multi-modal services, whether to allow to use a grant scheduling logical channel for multi-modal types can be determined based on the network configuration.

As an embodiment, if the attribute of current grant is multi-modality service and the network configuration indicates that it cannot be used for non-modality service, the UE cannot use the logical channel to transmit non-modality service, that is, it is not possible to use the grant scheduling logic channel to transmit non-modality services.

In some embodiments, based on the network configuration, it is determined that the logical channel scheduled by the grant information can be used for non-modality services, and then the logical channel scheduled by the grant information can be used for non-modality services.

As an embodiment, a specific service attribute can be configured for the logical channel, and a grant of this service attribute type being allowed or not can be configured for the logical channel.

In an embodiment, in the grant information provided by the network, the network may provide an indication in uplink grant information to inform the UE that the attribute of the current grant is used by a specific logical channel corresponding to a specific service type. As an embodiment, the attribute of current grant information is multi-modal service; and further indicates that logical channels in a specific logical channel list that perform a certain task together can be multiplexed, then the UE needs to judge whether the logical channel belongs to the allowed logical channel list before using the grant information.

For example, if the grant information indicates that it is only used by logical channels 1, 2 and 3, the UE needs to decide whether it belongs to the allowed grant channel list.

For another example, whether other logical channels are allowed to use the grant indicating the logical channel list can be indicated based on the network configuration.

As an embodiment, the attribute of current grant information is multi-modal service; and further indicates that only a logical channel group that perform a certain task together can be multiplexed, the UE needs to judge whether or not the logical channel belongs to the group before using the grant information.

For example, if the grant information indicates that only the specific service is applicable to Group 1, and the UE decides that Group 1 includes logical channels 1, 2 and 3, then logical channels 1, 2 and 3 can be used to transmit the specific service. In some embodiments, it can be determined whether the logical channels contained in the logical channel group of a specific service can be used for non-specific services based on the network configuration.

In some embodiments, the base station obtains group information of logical channel group(s) that jointly perform a certain task from a core network.

As an embodiment, a packet data network (PDN) session establishment information element (IE) in a service request message carries cooperative control information, for example, a PDN session request IE indicates which group it belongs to, and at this time, the base station can map all QoS flows in the PDN session to the group(s) to which the logical channels belong.

As an embodiment, a QoS flow establishment IE in a handover request message carries cooperative control information, for example, a certain QoS flow specifies to which logical channel(s) it belongs, and at this time, the base station can group the logical channel(s) to which the QoS flow is mapped into a logical channel group.

The UE obtains the group information of the uplink logical channel and/or the auxiliary information of the uplink logical channel from the network.

As an embodiment, the base station informs the UE that logical channel 1, logical channel 2 are both used for multi-modal acquisition and belong to logical channel group 0. For example, a base station obtains logical channel group information from a core network, such as a QoS flow establishment IE in a service request of the core network carries cooperative control information, such as a certain QoS flow specifies which logical channels it belongs to. At this time, the base station can map the logical channels to which the QoS flow belongs to form a logical channel group.

In an embodiment, the base station can notify the UE by broadcast signaling or dedicated signaling.

As an embodiment, the base station informs the UE of the group information to which the logical channel belongs via a re-configuration message or a release message.

The base station informs the UE of the binding relationship between the logical channel and the logical channel group that jointly executes a certain service type in a downlink direction, and the UE uses the downlink mapping relationship in reverse for uplink.

As an embodiment, the base station informs the UE that logical channel 1 and logical channel 2 in the downlink direction belong to logical channel group 0, and the UE automatically uses this binding relationship for uplink transmission.

In the configuration information of the logical channel, it send group information of the logical channels, and/or indicates the binding relationship between the logical channel and the service type.

Figure 9:
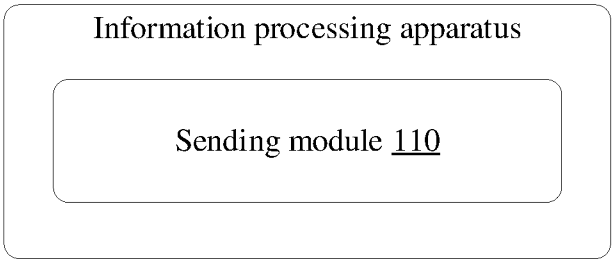
FIG. 9 is a flowchart of an information processing apparatus according to an embodiment of the present disclosure.

As shown in FIG. 9, an embodiment of the present disclosure provides an information processing apparatus, including:

a sending module 110, configured to send grant information, where the grant information is used for logical channel multiplexing for a first type of service.

In some embodiments, the sending module 110 may be a program module; and after the program module is executed by a processor, the grant information can be sent.

In some embodiments, the sending module 110 may be a hardware-software combination module, and the hardware-software combination module includes, but is not limited to, various programmable arrays, the programmable arrays include, but are not limited to, field programmable arrays and/or complex programmable arrays.

In still other embodiments, the sending module 110 may be a pure hardware module, and the pure hardware module includes, but is not limited to, an application specific integrated circuit.

In some embodiments, the first type of service includes at least one of the following:

a vertical field service; or a multi-modality service.

In some embodiment, the grant information includes:

attribute information, where the attribute information indicates that the grant information is aimed at the first type of service; and/or auxiliary information, where the auxiliary information indicates one or more logical channels related to the grant information.

In some embodiments, the attribute information includes at least one of the following:

a service identification of the first type of service; or a service attribute of the first type of service.

In some embodiments, the auxiliary information includes at least one of:

a logical channel list, where the logical channel list includes: a logical channel identification ID of at least one logical channel; or group information of a logical channel group, where the logical channel group includes at least one logical channel.

In some embodiments, the sending module 110 is configured to send a network configuration, where the network configuration is at least used for indicating whether the grant information for the first type of service is used for a second type of service.

In some embodiments, the network configuration contains a first indication, and the grant information cannot used for logical channel multiplexing for the second type of service; and/or the network configuration contains a second indication, and the grant information can used for logical channel multiplexing for the second type of service.

In some embodiment, the apparatus further includes:

a determining module configured to determine group information for a logical channel group according to a received service request message for the first type of service, where the logical channel group includes: one or more logical channels, and the logical channel group is used for the first type of service.

In some embodiments, the service request message is used for indicating one or more packet data network PDU sessions associated with the first type of service; or, the service request message is used for indicating one or more QoS flows associated with the first type of service.

In some embodiment, the service request message includes:

a PDN session establishment message; or, a QoS establishment message.

In some embodiments, the sending module 110 is configured to send the grant information according to the group information.

In an embodiment, the grant information is used for a scheduling of uplink transmission.

In some embodiments, the grant information, is used for the scheduling of the uplink transmission, and a logical channel corresponding to the group information is used for downlink transmission of a specific task.

In some embodiments, the sending module 110 is further configured to send configuration information of one or more logical channels, where the configuration information indicates at least one of:

group information of a logical channel group; where the logical channel group includes at least one logical channel; or a binding relationship between logical channel and service type.

Figure 10:
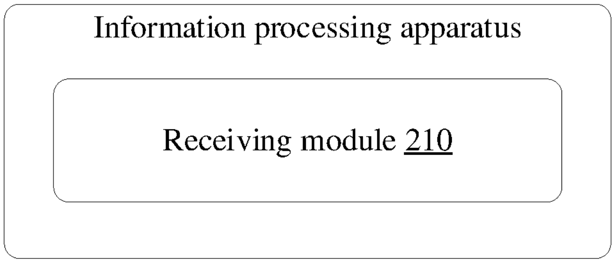
FIG. 10 is a flowchart of an information processing apparatus according to an embodiment of the present disclosure.

As shown in FIG. 10, an embodiment of the present disclosure provides an information processing apparatus, including:

a receiving module 210, configured to receive grant information, where the grant information is used for logical channel multiplexing for a first type of service.

In some embodiments, the receiving module 210 may be a program module; and after the program module is executed by a processor, the grant information can be received.

In some embodiments, the receiving module 210 may be a hardware-software combination module, and the hardware-software combination module includes, but is not limited to, various programmable arrays, the programmable arrays include, but are not limited to, field programmable arrays and/or complex programmable arrays.

In still other embodiments, the receiving module 210 may be a pure hardware module, and the pure hardware module includes, but is not limited to, an application specific integrated circuit.

In some embodiments, the first type of service includes at least one of the following:

a vertical field service; or a multi-modality service.

In some embodiment, the grant information includes:

attribute information, where the attribute information indicates that the grant information is aimed at the first type of service; or, auxiliary information, where the auxiliary information indicates one or more logical channels associated with the grant information.

In some embodiments, the attribute information includes at least one of:

a service identification of the first type of service; or a service attribute of the first type of service.

In some embodiments, the auxiliary information includes at least one of:

a logical channel list, where the logical channel list includes: a logical channel identification ID of at least one logical channel; or group information of a logical channel group, where the logical channel group includes at least one logical channel.

In some embodiments, the receiving module 210 is configured to receive a network configuration, where the network configuration is at least used for indicating whether a logical channel scheduled by the grant information for the first type of service is used for a second type of service.

In some embodiments, the network configuration contains a first indication that the logical channel associated with the grant information cannot be used for logical channel multiplexing for the second type of service; and/or, the network configuration includes a second indication, and the logical channel associated with the grant information is used for logical channel multiplexing for the second type of service.

In an embodiment, the grant information is used for a scheduling of uplink transmission.

In some embodiments, the receiving module 210 is further configured to receive configuration information of one or more logical channels, where the configuration information indicates at least one of:

group information of a logical channel group; where the logical channel group includes at least one logical channel; or a binding relationship between logical channel and service type.

An embodiment of the present disclosure provides a communication device, including:

a memory, configured to store processor-executable instructions;

one or more processors, respectively connected with the memory;

where, the processor is configured to execute the information processing method provided by any of the foregoing technical solutions.

The processor may include various types of storage media that are non-transitory computer storage media capable of continuing to memorize the information stored thereon after the communication device is powered down.

The communication device includes an access device or UE or a core network device.

The processor may be connected to the memory via a bus, etc., for reading an executable program stored on the memory, e.g., at least one of the methods as shown in FIGS. 2 to 8.

Figure 11:
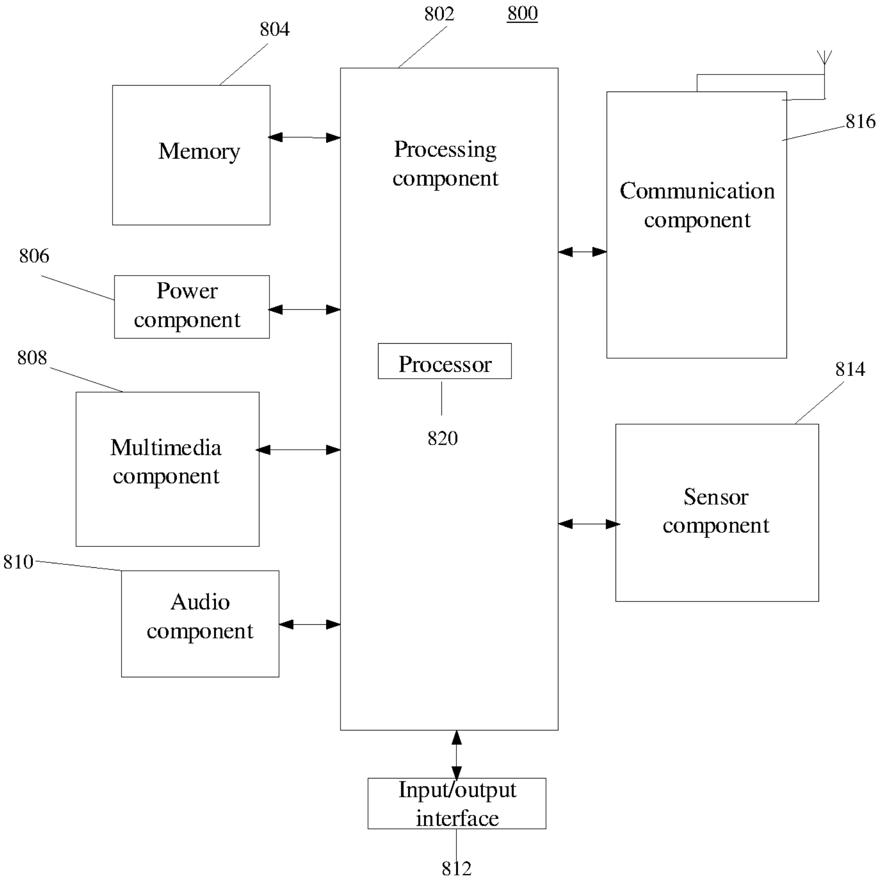
FIG. 11 is a schematic structural diagram of a UE according to an embodiment of the present disclosure.

FIG. 11 is a block diagram of a UE 800 according to an embodiment of the present disclosure. For example, the UE 800 may be a mobile phone, a computer, a digital broadcasting user equipment, a messaging device, a game console, a tablet device, a medical device, a fitness device, a personal digital assistant, etc.

Referring to FIG. 11, the UE 800 may include one or more of the following components: a processing component 802, a memory 804, a power component 806, a multimedia component 808, an audio component 810, an input/output (I/O) interface 812, a sensor component 814, and a communication component 816.

The processing component 802 generally controls the overall operation of the UE 800, such as operations associated with display, telephone call, data communication, camera operation and recording operation. The processing component 802 may include one or more processors 820 to execute instructions to complete all or part of steps of the above-mentioned method. In addition, the processing component 802 may include one or more modules to facilitate interactions between the processing component 802 and other components. For example, the processing component 802 may include a multimedia module to facilitate interactions between the multimedia component 808 and the processing component 802.

The memory 804 is configured to store various types of data to support operations in the UE 800. Examples of these data include instructions of any application program or method for being operated on the apparatus UE 800 contact data, phone book data, messages, pictures, videos, etc. The memory 804 can be implemented by any type of volatile or non-volatile memory device or combinations thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power component 806 provides power to various components of the UE 800. The power component 806 may include a power management system, one or more power supplies, and other components associated with generating, managing and distributing power for the UE 800.

The multimedia component 808 includes a screen that provides an output interface between the UE 800 and a user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touching, sliding and gestures on the touch panel. The touch sensor may not only sense a boundary of a touching or sliding action, but also detect a duration and a pressure related to the touching or sliding operation. In some embodiments, the multimedia component 808 includes a front camera and/or a rear camera. When the UE 800 is in an operation mode, such as a shooting mode or a video mode, the front camera and/or the rear camera can receive external multimedia data. Each front camera and rear camera may be a fixed optical lens system or have focal length and optical zoom capability.

The audio component 810 is configured to output and/or input audio signals. For example, the audio component 810 includes a microphone (MIC) configured to receive external audio signals when the UE 800 is in the operation mode, such as a calling mode, a recording mode and a voice recognition mode. The received audio signal may be further stored in the memory 804 or transmitted via the communication component 816. In some embodiments, the audio component 810 further includes a speaker for outputting audio signals.

The I/O interface 812 provides an interface between the processing component 802 and peripheral interface modules, where the peripheral interface modules may be keyboards, click-wheels, buttons, etc. These buttons may include, but are not limited to: home button, volume button, start button and lock button.

The sensor component 814 includes one or more sensors for providing various aspects of state evaluation for the UE 800. For example, the sensor component 814 can detect an on/off state of the UE 800, a relative positioning of components, for example, the components are the display and the keypad of the UE 800, and the sensor component 814 can also detect a position change of the UE 800 or a component of the UE 800, presence or absence of user contact with the UE 800 orientation or acceleration/deceleration of the UE 800 and a temperature change of the UE 800. The sensor component 814 may include a proximity sensor configured to detect presence of a nearby object without any physical contact. The sensor component 814 may also include an optical sensor, such as a CMOS or CCD image sensor, for use in imaging applications. In some embodiments, the sensor component 814 may further include an acceleration sensor, a gyroscope sensor, a magnetic sensor, a pressure sensor or a temperature sensor.

The communication component 816 is configured to facilitate wired or wireless communication between the UE 800 and other devices. The UE 800 can access a wireless network based on communication standards, such as WiFi, 2G or 3G, or combinations thereof. In an embodiment of the present disclosure, the communication component 816 receives a broadcast signal or broadcast related information from an external broadcast management system via a broadcast channel. In an embodiment of the present disclosure, the communication component 816 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an embodiment of the present disclosure, the UE 800 may be implemented by one or more application-specific integrated circuits (ASIC), digital signal processors (DSP), digital signal processing devices (DSPD), programmable logic devices (PLD), field programmable gate arrays (FPGA), controllers, micro-controllers, micro-processors or other electronic components, for executing the above-mentioned method.

In an embodiment of the present disclosure, a non-transitory computer-readable storage medium is further provided, such as the memory 804 including instructions, where the instructions can be executed by a processor 820 of the UE 800 to complete the above-mentioned delay determination method. For example, the non-transitory computer-readable storage medium may be an ROM, a random access memory (RAM), a CD-ROM, a magnetic tape, a floppy disk, an optical data storage device, etc.

Figure 12:
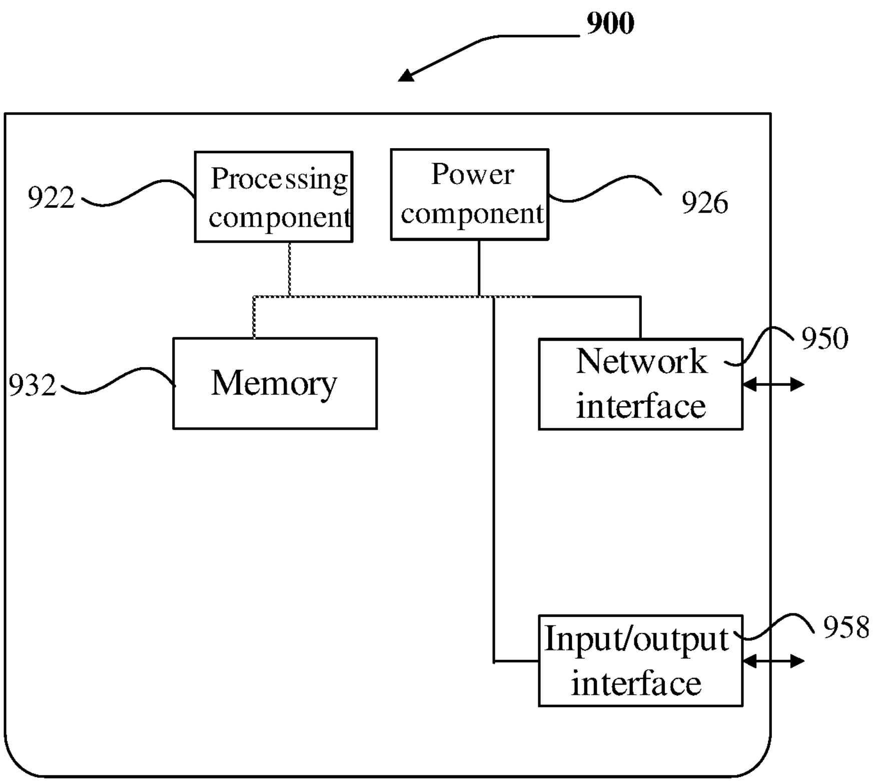
FIG. 12 is a schematic structural diagram of a communication device according to an embodiment of the present disclosure.

As shown in FIG. 12, an embodiment of the present disclosure shows a structure of an access device. For example, a communication device 900 can be provided as a network-side device. The communication device may be the aforementioned access device and/or core network device and/or UE.

Referring to FIG. 12, the communication device 900 includes a processing component 922, which further includes one or more processors, and memory resources represented by a memory 932 for storing instructions that can be executed by the processing component 922, such as application programs. An application program stored in the memory 932 may include one or more modules each corresponding to a set of instructions. In addition, the processing component 922 is configured to execute instructions to execute the information processing method provided by any one of the above methods, for example, the methods shown in FIGS. 2 to 8.

The communication device 900 may further include a power component 926 configured to perform power management of the communication device 900, a wired or wireless network interface 950 configured to connect the communication device 900 to a network, and an input-output (I/O) interface 958. The communication device 900 can operate based on an operating system stored in the memory 932, such as Windows Server™, Mac OS X™, Unix™, Linux™, FreeBSD™ or the like.

Other embodiments of the present disclosure will easily occur to those skilled in the art after considering the specification and practicing the present disclosure disclosed herein. The present disclosure is intended to cover any variations, uses or adaptations of the present disclosure, and these variations, uses or adaptations follow general principles of the present disclosure and include common sense or common technical means in the technical field that are not disclosed in the present disclosure. The specification and embodiments are to be regarded as exemplary only, and true scope and spirit of the present disclosure are indicated by the following claims.

It should be understood that the present disclosure is not limited to precise structures described above and shown in the accompanying drawings, and various modifications and changes can be made without departing from its scope. The scope of the present disclosure is limited only by the appended claims.

The invention claimed is:

1. An information processing method, performed by a network device, comprising:

sending grant information, wherein the grant information is used for logical channel multiplexing for a first type of service;

wherein the grant information comprises auxiliary information, the auxiliary information indicates information of one or more logical channels related to the grant information, and the information of one or more logical channels comprises a logical channel list, wherein the logical channel list comprises: a logical channel identification of at least one logical channel; or group information of a logical channel group, wherein the logical channel group comprises at least one logical channel;

wherein the information processing method further comprises:

determining the group information for the logical channel group according to a service request message for the first type of service sent by a core network device, wherein the logical channel group is used for the first type of service, the network device is an access network device;

wherein the service request message is used for indicating one or more packet data unit (PDU) sessions associated with the first type of service, or one or more quality of service (QoS) flows associated with the first type of service.

2. The method according to claim 1, wherein the first type of service comprises at least one of:

a vertical field service; or a multi-modality service.

3. The method according to claim 1, wherein the grant information comprises at least one of:

attribute information, wherein the attribute information indicates that the grant information is configured for the first type of service.

4. The method according to claim 3, wherein the attribute information comprises at least one of:

a service identification of the first type of service; or a service attribute of the first type of service.

5. The method according to claim 1, further comprising: sending a network configuration, wherein the network configuration is at least used for indicating whether the grant information for the first type of service is used for a second type of service.

6. The method according to claim 5, wherein the network configuration comprises at least one of:

a first indication, wherein the first indication indicates that the grant information is not used for logical channel multiplexing for the second type of service; or a second indication, wherein the second indication indicates that the grant information is used for logical channel multiplexing for the second type of service.

7. The method according to claim 1, wherein, the service request message comprises: a packet data network (PDN) session establishment message, or a QoS establishment message.

8. The method according to claim 1, wherein sending the grant information comprises:

sending the grant information according to the group information.

9. The method according to claim 1, wherein the grant information is used for a scheduling of uplink transmission.

10. The method according to claim 1, further comprising: sending configuration information of one or more logical channels, wherein the configuration information indicates at least one of:

the group information of the logical channel group; or a binding relationship between logical channel and service type.

11. An information processing method, performed by a user equipment (UE), comprising:

receiving grant information, wherein the grant information is used for logical channel multiplexing for a first type of service;

wherein the grant information comprises auxiliary information, the auxiliary information indicates information of one or more logical channels related to the grant information, and the information of one or more logical channels comprises a logical channel list, wherein the logical channel list comprises: a logical channel identification of at least one logical channel; or group information of a logical channel group, wherein the logical channel group comprises at least one logical channel;

wherein the access network device is configured to determine the group information for the logical channel group according to a service request message for the first type of service sent by a core network device, wherein the logical channel group is used for the first type of service;

wherein the service request message is used for indicating one or more packet data unit (PDU) sessions associated with the first type of service, or one or more quality of service (QoS) flows associated with the first type of service.

12. The method according to claim 11, wherein the first type of service comprises at least one of:

a vertical field service; or a multi-modality service.

13. The method according to claim 12, further comprising:

receiving a network configuration, wherein the network configuration is at least used for indicating whether a logical channel scheduled by the grant information for the first type of service is used for a second type of service.

14. The method according to claim 13, wherein the network configuration comprises at least one of:

a first indication, wherein the first indication indicates that the logical channel associated with the grant information is not used for logical channel multiplexing for the second type of service; or a second indication, wherein the second indication indicates that the logical channel associated with the grant information is used for logical channel multiplexing for the second type of service, wherein the grant information is used for a scheduling of uplink transmission.

15. The method according to claim 11, wherein the grant information comprises:

attribute information, wherein the attribute information indicates that the grant information is aimed at the first type of service;

wherein the attribute information comprises at least one of:

a service identification of the first type of service; or a service attribute of the first type of service.

16. The method according to claim 11, further comprising:

receiving configuration information of one or more logical channels, wherein the configuration information indicates at least one of:

the group information of the logical channel group; or a binding relationship between logical channel and service type.

17. A communication device, comprising:
a processor;
a transceiver; and
a memory storing a program executable by the processor,
wherein the processor is configured to perform the method according to claim 11.

18. A communication device, comprising:
a processor;
a transceiver; and
a memory storing a program executable by the processor,
wherein the processor is configured to:
send grant information, wherein the grant information is used for logical channel multiplexing for a first type of service;
wherein the grant information comprises auxiliary information, the auxiliary information indicates information of one or more logical channels related to the grant information, and the information of one or more logical channels comprises a logical channel list, wherein the logical channel list comprises: a logical channel identification of at least one logical channel; or group information of a logical channel group, wherein the logical channel group comprises at least one logical channel;
wherein the processor is further configured to:
determine the group information for the logical channel group according to a service request message for the first type of service sent by a core network device, wherein the logical channel group is used for the first type of service, the network device is an access network device;
wherein the service request message is used for indicating one or more packet data unit (PDU) sessions associated with the first type of service, or one or more quality of service (QoS) flows associated with the first type of service.

* * * * *